US008924725B2

(12) United States Patent
Russell et al.

(10) Patent No.: US 8,924,725 B2
(45) Date of Patent: Dec. 30, 2014

(54) AUTHENTICATED FILE HANDLES FOR NETWORK FILE SYSTEMS

(71) Applicant: International Business Machines Corporation, Armonk, NY (US)

(72) Inventors: Paul F. Russell, Hackham (AU); Leif R. Sahlberg, Kariong (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/164,420

(22) Filed: Jan. 27, 2014

(65) Prior Publication Data

US 2014/0143535 A1    May 22, 2014

Related U.S. Application Data

(63) Continuation of application No. 13/568,785, filed on Aug. 7, 2012, now abandoned.

(51) Int. Cl.
*H04L 9/32* (2006.01)
*G06F 21/62* (2013.01)
*H04L 29/06* (2006.01)
*G06F 17/30* (2006.01)

(52) U.S. Cl.
CPC .......... *H04L 63/166* (2013.01); *G06F 21/6218* (2013.01); *H04L 9/3242* (2013.01); *G06F 17/30165* (2013.01)
USPC ........... 713/168; 713/152; 713/165; 713/187; 726/1; 726/3; 726/21; 726/26; 707/782; 707/783; 707/827; 709/230

(58) Field of Classification Search
None
See application file for complete search history.

(56) References Cited

U.S. PATENT DOCUMENTS

| 6,678,828 | B1 | 1/2004 | Zhang et al. |
| 7,254,636 | B1 | 8/2007 | O'Toole, Jr. et al. |
| 7,739,301 | B2 | 6/2010 | Bojinov et al. |
| 2005/0210072 | A1* | 9/2005 | Bojinov et al. ............... 707/200 |
| 2006/0271598 | A1* | 11/2006 | Wong et al. .................. 707/200 |
| 2007/0078819 | A1* | 4/2007 | Zayas et al. ....................... 707/2 |
| 2008/0165957 | A1* | 7/2008 | Kandasamy et al. ........... 380/44 |
| 2013/0191629 | A1* | 7/2013 | Treinen et al. ................ 713/153 |

OTHER PUBLICATIONS

Traeger et al., "NFS File Handle Security", version 3.59. May 14, 2004.*

(Continued)

*Primary Examiner* — Shewaye Gelagay
(74) *Attorney, Agent, or Firm* — IBM Patent Center

(57) ABSTRACT

One or more file sharing computers receives a client request including an IP address and port number used by the client (computer). The one or more computers respond by creating an enhanced file handle from a hash on a combination of the IP address, port number, restricted key, and a standard file handle, and concatenating the hash with the standard file handle. The enhanced file handle is sent to the client and used by the client in a second request. The one or more computers uncouple the standard file handle and hash combination. Using the client IP address, port number, restricted key and standard file handle from the client second request, the one or more computers create a second combination. The second combination hash is compared to the first combination hash and in response to determining a match, the second request is accepted, and otherwise denied.

6 Claims, 5 Drawing Sheets

(56) References Cited

OTHER PUBLICATIONS

Barr, T. et al.; "Linux NFS—HOWTO" Revision v3.1 Sections 2, 6. [online] Retrieved from the Internet: <URL:http://www.tldp.org/HOWTO/NFS-HOWTO/index.html>, Aug. 25, 2002.

Callaghan, B. et al.; "NFS Version 3 protocol Specification" Sections 1.1, 1.3, 1.5, 2.1, 2.2, 2.3, 4.1, 4.2, 4.4. Sun Microsystems, Inc. Jun. 1995. [online] Retrieved from the internet: <URL:http://www.cse.ohio-state.edu/cgi-bin/rfc/rfc1813.html>.

Traeger, A., "NFS File Handle Security". File translated from TEX by TTH, version 3.59. May 14, 2004.

* cited by examiner

AUTHENTICATED FILE HANDLES FOR NETWORK FILE SYSTEMS

CROSS REFERENCE TO RELATED APPLICATION

This application is a continuation of U.S. patent application Ser. No. 13568785 filed Aug. 7, 2012 the entire content and disclosure of which is incorporated herein by reference.

FIELD OF THE INVENTION

The present invention relates generally to distributed file system security, and more particularly to a creating and authenticating file handles used in a network file system.

BACKGROUND

A network based client-server environment can be used to implement a distributed file system that provides a client access to files stored on one or more remote servers. These files are accessed through a network and are represented as though the files were stored local to the client. One example of such a file system is a network file system (NFS) that was developed by Sun Microsystems. NFS version 3 is one of the most common distributed file systems in use today and version 3 standards are documented in RFC 1813. NFS is a stateless protocol which means that the file server does not store per-client information or the access status of a file. Rather, the NFS server supports a lookup procedure that uses a "file handle" to uniquely identify a specific file located on a network file server and indicate the file to be available to the client presenting the file handle, if approved to access the file. NFS uses export points which are directories positioned as the root directory of a sub-tree to be exported or made accessible to an approved client. From an NFS perspective, a directory is basically a file containing other files, and file attribute information has flags set to inform the system that the file is actually a directory. Similar to the social security number, there is a concept of an inode number which uniquely exists for all the files on the system. An inode (index node) is a data structure found in many Unix file systems, which stores all the information about a file system object (file directory, etc.), except the data content and file name.

The NFS server is configured with a list of clients and export points that each client may access. When a client requests connection to the file server and access to an export point directory, the request is referred to as a "mount". A client that wishes to mount one of the directories first contacts the mount daemon on the server (mountd). A daemon in a multitasking computer is a program process that runs in the background rather than run by an interactive user. If the client is authorized, the mount daemon processes the client request and provides the client with a root file handle, which can be presented to the NFS daemon (nfsd) on the file server to access objects in the export point.

File handles are used to uniquely describe the file or directory on which an operation is to be performed. File handles include three areas of information, a volume identifier, an inode number, and a generation number. Together, these three items constitute a unique identifier for a file or directory that a client wishes to access. The volume identifier informs the server as to which file system the request refers to, because an NFS server can export more than one file system. The inode number tells the server which file within that partition the request is accessing and the generation number is needed when reusing an inode number in which case the inode number is incremented thus insuring that a client with an old file handle can't accidentally access the newly-allocated file. An inode number points to a data structure in which information about the file can be found, that in part can include: the size of the file, user ID of the file, device ID, group ID, access privileges, pointers to the storage of the content, time stamp of file creation and modification, as well as other attributes. In general, the inode contains all information about a file outside of the actual name of the file and the actual data content of the file.

Normal access involves a file server being set up with minimal information regarding a client user, such as assigning a user ID and determining the files and directories the client is authorized to access. Clients initiate a connection to the file server by a programming step referred to as a mounting operation (mound), which is often included in client boot up code. Opaque to the client, the file server and client exchange communications and the successful result is for the client to display one or more shared directories as if the one or more shared directories are a disk partition attached locally to the client.

SUMMARY

Embodiments of the present invention provide a system, method, and program product for enhancing a file handle within a distributed file sharing system, which includes one or more computers connected to a network. The one or more computers receive a first client request that includes information about a network location of a client and a transport protocol port number used by the client to communicate to one or more computers. Upon receiving the first client request, the one or more computers respond by creating a standard file handle. The one or more computers generate a first combination that includes the information received from the first client request, the standard file handle and a key that includes a random value, where the random value of the key is restricted to the one or more computers. The one or more computers encrypt the first combination and append the encrypted first combination to the standard file handle, creating an enhanced file handle. The computer sends the enhanced file handle to the client that made the request and receives a second client request that includes information regarding the network location of the client and the transport protocol port number used by the client to communicate to the one or more computers, and the enhanced file handle. Upon receiving the second client request, the one or more computers uncouple the standard file handle and the encrypted first combination from the enhanced file handle. The one or more computers generate a second combination from the information received in the second client request, the standard file handle uncoupled from the enhanced file handle of the second client request and the key that includes the random value that is restricted to the one or more computers. The one or more computers encrypt the second combination and compare the encrypted second combination to the encrypted first combination. In response to determining that the encrypted second combination matches the encrypted first combination, the one or more computers accept the second client request.

DETAILED DESCRIPTION

Figure 1:
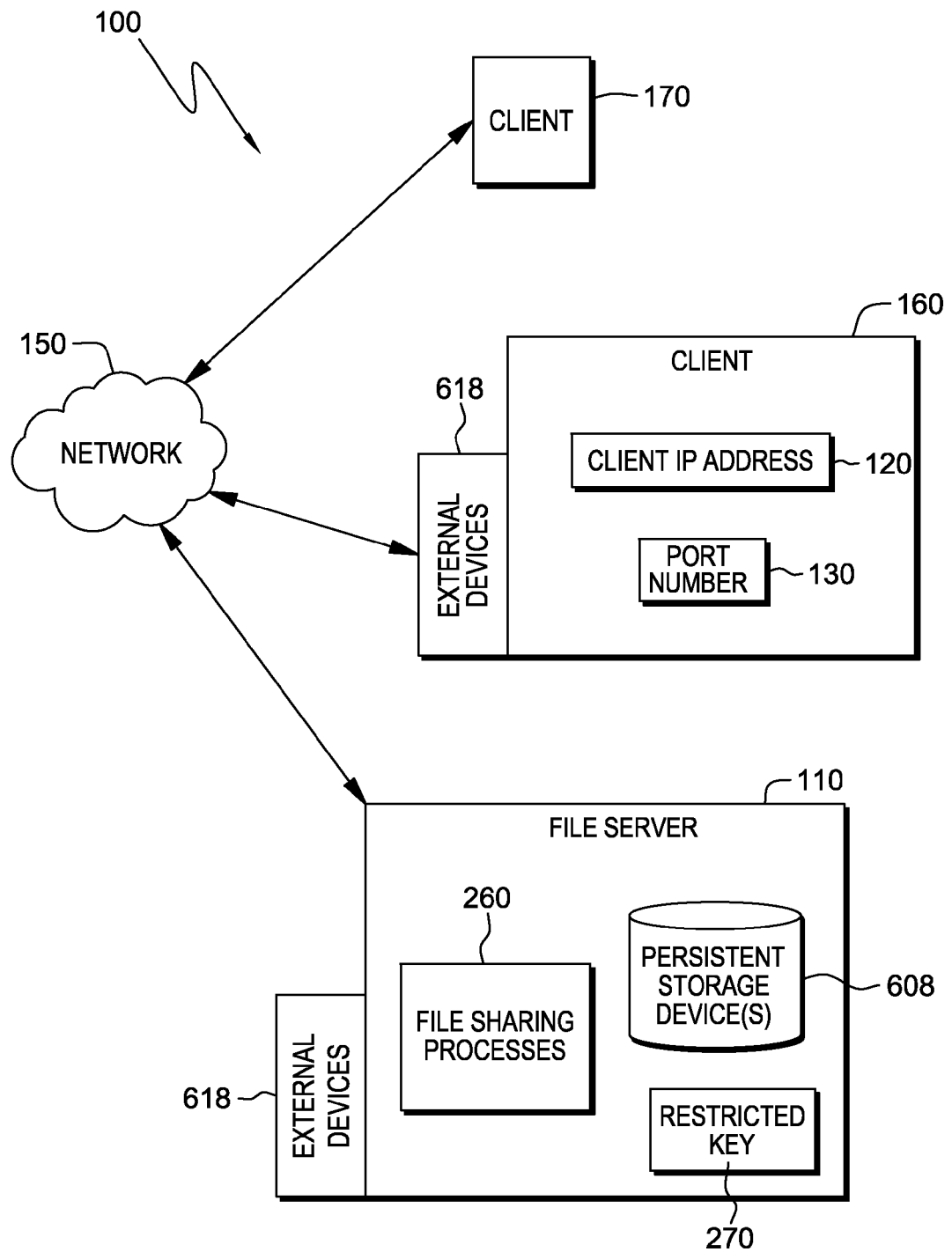
FIG. 1 is a block diagram of a distributed file sharing system in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Implementations of distributed file system protocols, such as Network File System (NFS), benefit from a client computer, referred to hereafter as the client, having approved network access to files as if the files were attached to the client local hard drive. Some distributed file sharing systems operate in a stateless mode, in which the server hosting and controlling access to the shared files, does not maintain information regarding the protocol state of the clients and does not retain previous request information. The client maintains the required information to send a request to the server and in the event of the server going down or requiring a reboot, no state information is lost and the client only needs to re-transmit a request until the server responds.

To enable use of distributed shared file systems, such as NFS, exemplary embodiments of the present invention operate using an abstraction layer of Remote Procedure Call (RPC), which can be used independent of the operating system, transport protocol or hardware type. File identification is done by the server responding directly to a client request, without the need or use of a proxy server, by creating a file handle that is sent to the client. The client uses the file handle to reference a file or directory when requesting operations or performing activities. The file handle remains opaque to the client. A program, referred to as the port-mapper, maps RPC services to the ports on which the RPC services are listening and the client is redirected to the proper port number to communicate service requests. In all but the most recent version of NFS, the port-mapper function is used. However, in NFS version 4, the stateless environment is no longer used and the application tracks client and file status, eliminating the need for the port-mapper function.

A distributed file sharing system includes one or more computing devices, hereafter referred to as file servers, that perform various file sharing programs controlling and providing client access to shared files. Subsequently, the one or more file servers will be referred to as the file server or specifically as file server 110 as will be discussed in regard to FIG. 1.

Despite the convenience and ease of use of distributed file sharing systems, such as NFS, for example, there are drawbacks that have been identified. The RPC protocol includes a slot for authentication parameters for each call. One common type of authentication used is AUTH_UNIX, which provides a UNIX-style user ID, group ID, and groups with each call. Another authentication parameter type is AUTH_DES which provides DES-encrypted authentication parameters based on a network-wide name, with session keys exchanged via a public key scheme. DES-encrypted authentication is somewhat effective, but requires third party authentication. Many NFS version 3 installations use AUTH_UNIX, depending on a user ID and group ID for authentication. In some cases, distributed file sharing systems choose AUTH_NONE, which provides no authentication checking and relies entirely on network access security.

When creating a file handle, the format is typically dependent on the operating system installed, and several components of the file handle may be reasonably simple for a malicious attacker to guess. For example, a file system ID often includes a timestamp, which significantly limits the file system ID values that are used and can be easily obtained by brute force methods. Identifying a user typically involves accepting a user ID (UID) presented by a client, which can be guessed, or stolen if network access can be acquired. In many cases, if the operating system of a file server is known or can be determined, components of a file handle can be anticipated; each being well documented in size and common default values. This makes the random components of the file handle smaller in size and therefore easier to determine by guessing, network sniffing or by brute force techniques. Once an attacker has a validated file handle, access to the file server through normal mounting operations can be bypassed and the attacker has direct access to the NFS daemon (nfsd), enabling receipt of client requests and actions to perform file operations.

NFS file handles are used to associate clients with directories and files. The ability for NFS to operate across a wide range of hardware, operating systems and transport protocols, and the ease of access and use by clients is somewhat offset by a higher risk of security failure if a file handle is compromised. Techniques to improve the security of NFS have been developed. Certain techniques require the construction of a mapping database in which random file handles are created and mapped to real file handles which adds redundancy and significant administrative overhead for systems with large numbers of active files. The random use of mapped file handles results in file handles that are not unique per client, which still leaves a security exposure for stolen file handles.

Other techniques of adding authentication models to the file request operations can add significantly more processing time, client wait time, file server response time, administrative overhead or possibly additional hardware requirements.

Embodiments of the present invention will now be described in detail with reference to the accompanying drawings.

FIG. 1 is a block diagram of a distributed file sharing system 100, in accordance to an embodiment of the present invention. Distributed file sharing system 100 includes a file server 110, on which directories and files are organized and hosted, and one or more client computing devices represented by a client 160 and a client 170, all interconnected over a network 150.

File server 110 is illustrated in FIG. 1 as a computing device within distributed file sharing system 100 that is capable of storing files to be shared and is configured to connect to network 150 and communicate with client 160 and client 170. File server 110 is further configured to receive and perform distributed file sharing protocol instructions.

In exemplary embodiments, file server 110 includes restricted key 270, file sharing processes 260 and internal components 600, which also includes persistent storage device(s) 608. In an exemplary embodiment, file sharing processes 260 is a group of computer program processes that function to provide the file sharing set-up configuration activities, perform file sharing requests from clients and perform system and transaction activity associated with file sharing. File sharing processes 260 includes processes to create an enhanced file handle such that the enhanced file handle is unique to each client-file association, and the enhanced file handle includes additional information used to protect file handles from being guessed, sniffed and/or obtained by practical brute force efforts. File sharing processes 260 will be discussed in more detail with respect to FIG. 4. File server 110 is further depicted as including internal components 600, which also includes persistent storage device(s) 608. Persistent storage device(s) 608 represents one or more physical storage devices connected to file server 110 and hosts, among other items, the files to be shared with the clients of a distributed file sharing systems, such as NFS, for example. File server 110 includes a randomly generated number or key of a length determined to provide protection from brute force or other malicious attack determination, which is generated by and known only to file server 110. This key will subsequently be referred to as a restricted key 270. In an exemplary embodiment, restricted key 270 is at least 256 bits in length and can randomly assume any persistent value attainable with the bit length of restricted key 270. Restricted key 270 is uniquely known to file server 110 and is not sent to, or shared with, other computing devices. Restricted key 270 is stored securely on file server 110. File server 110 is illustrated as also including external device(s) 618 and internal components 600. External device(s) 618 includes the hardware components that enables file server 110 to connect to a network and communicate to other computing devices such as client 160 and client 170, for example. External device(s) 618 will be discussed in detail with respect to FIG. 6. Internal components 600 include persistent storage device(s) 608, among other components, and will be discussed in detail with respect to FIG. 6.

File server 110 can be any computing device capable of communicating to other computing devices over a network, and able to execute program instructions to store, retrieve, and perform operations on requested files. File server 110 can be a properly configured personal computer, server computer, blade server, laptop device, mainframe computer, multiprocessor system, microprocessor-based system, network PC, a distributed cloud computing environment that includes any one or combination of the above systems or devices, or any computing device enabled to store shared files, connect and communicate to other client computing devices over network 150 and perform programming modules enabling file sharing among approved clients.

Client 160 and client 170 are client computing devices that connect to network 150 and can communicate to, and receive responses from, file server 110. Client 160 and client 170 are configured to initiate a distributed file sharing system, such as NFS, with file server 110. Client 160 and client 170 can be, but are not limited to, a laptop, tablet, or netbook personal computer (PC), a desktop computer, a mainframe or mini computer, a personal digital assistant (PDA), a smart phone or a tablet computing device. In general, client 160 and client 170 can be any programmable electronic device as described in further detail with respect to FIG. 6.

FIG. 1 depicts client 160 as including internal components 600 which store and execute program instructions and send requests to and receive responses from, other computing devices. Client 160 also includes external device(s) 618 to enable connections to network 150 and communications with other computing devices that includes using transport protocols to send requests and receive responses from other computing devices, such as file server 110, for example.

FIG. 1 illustrates that client 160 includes a client IP address 120, which is a stable internet protocol (IP) address which serves to identify a network location of client 160. Client 160 also includes a port number 130 for making transport protocol requests to and replies from file server 110. Ports used for transport protocols, such as port number 130, are assigned a specific port number. For example, some implementations of NFS use port number 111 for port-mapper RPC services, 2049 for NFS RPC services and 32870 for transmission control protocol (TCP) RPC services, such as mount file system requests.

Network 150 can be for example, a local area network (LAN), a wide area network (WAN) such as the Internet, or a combination of the two, and include wired, wireless, or fiber optic connections. In general, network 150 can be any combination of connections and protocols that will support file server 110, client 160 and client 170 in accordance with an embodiment of the invention.

Figure 2:
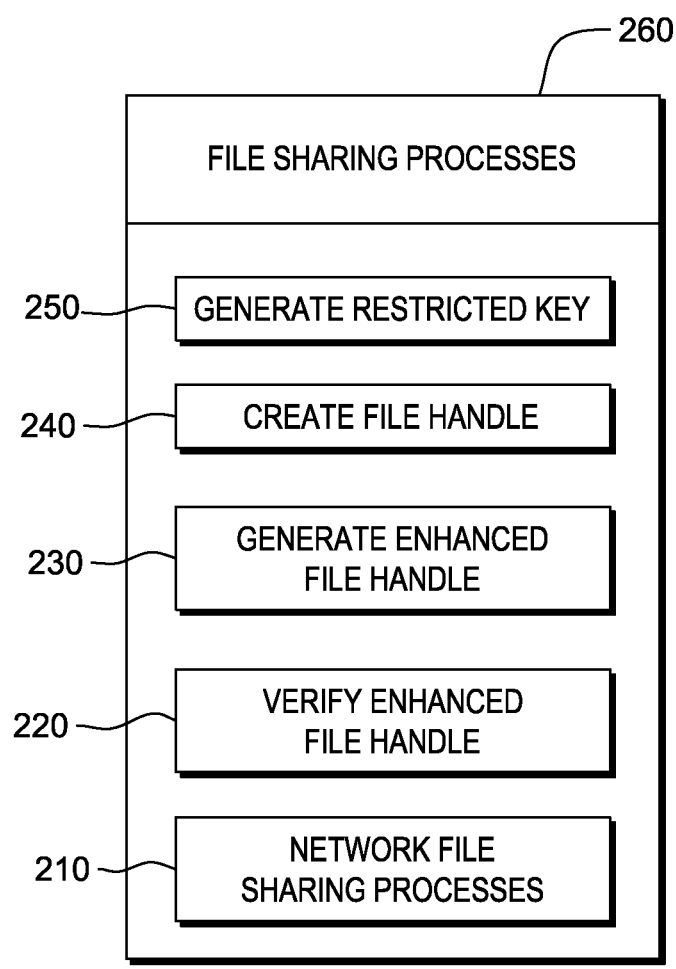
FIG. 2 is a block diagram of file sharing programs of a distributed file sharing system in accordance with an embodiment of the present invention.

FIG. 2 is a block diagram illustrating program processes that, at least in part, make up file sharing processes 260. File sharing processes 260 perform various activities that create and verify file handles as well as improve the file handle security of distributed file sharing system 100, such as the file handles for NFS, for example, as well as performing required operational activities of distributed file sharing system 100.

The program process that functions to create restricted key 270 is a generate restricted key 250. For file server 110, generate restricted key 250 is performed once to create a random number, and generate restricted key 250 securely stores the random number on file server 110 to be used by a generate enhanced file handle 230 program process. File sharing processes 260 includes a create file handle 240 program process which is used by file server 110 to create a file handle. Create file handle 240 produces a standard file handle, such as, for example, a file handle created by a file server using NSF version 3, in response to a client request to read, write, store, create, delete or perform other file operations. The standard file handle format can vary based on the operating system of file server 110, but typically the file handle includes a sequence of bytes that represent specific file sharing attributes and components. The specific file sharing attributes and components may include, but are not limited to: a file system identifier, a file identification number, a user identification number, a group identification number, a file size, an access mode, a time of last access, a time last modified, and a time of last status change.

Generate enhanced handle file 230 is a program process of distributed file sharing system 100, that creates file handles that are enhanced to provide additional security and uniqueness to each client and each file to be shared. In an exemplary embodiment, when a request is made by client 160 over network 150, the request is received by file server 110 and includes port number 130 used by client 160 and client IP address 120 of client 160. Generate enhanced file handle 230 uses client IP address 120 and port number 130 along with restricted key 270 and the standard file handle as unique identifying attributes. The terminology of "standard file handle" is used to refer to the file handles currently produced by existing distributed file sharing systems, such as NFS version 3, for example, and will subsequently be referred to as the "standard file handle", and be distinguished from the "enhanced file handle" of exemplary embodiments of the present invention. Generate enhanced file handle 230 combines the identifying attributes, which may include performing calculations or operations on some or all of the elements of the identifying attributes. The calculations or operations can include, but are not limited to, performing sequence operations, combinational operations, mathematical operations, substitution operations or other functions and/or operations that modify the values of the identifying attribute elements or modify the combination of the identifying attribute element values. Additionally, generate enhanced file handle 230 involves concatenating or combining the identifying attributes so that the combination provides a unique identifier that cannot be guessed, successfully acted upon if stolen, spoofed and/or determined by practical brute force methods. In an exemplary embodiment, generate enhanced file handle 230 also performs a cryptographic hashing operation on the resulting combination of these numbers. A cryptographic hash function is an algorithm that takes an arbitrary block of data and returns a fixed-size bit string. Even a small accidental or intentional change to the data will result, with a very high probability, in a significant change to the hash value. The cryptographic hashing operation creates an encrypted value with a standardized, constant, pre-defined length, which will display a significant change to the hash value with even a trivially small change to the original combination value. Thus, any tampering substitution that is not an exact match to the hash value is easily detected.

In different examples, there is latitude in determining how best to manipulate and combine the IP address and port number of the client, restricted key 270 known to file server 110, and the standard file handle produced by file server 110, to produce the resulting enhanced value, which will be hereafter referred to as the "combination". Different examples of combinations can include, but are not limited to, concatenation of the numbers in any preferred order, addition, subtractions, multiplication, division, or any combination of these or other operations on the IP address and port number of the client, restricted key 270 known to file server 110, and the file handle produced by file server 110, to produce the enhancement to the file handle that offers additional security.

Figure 4:
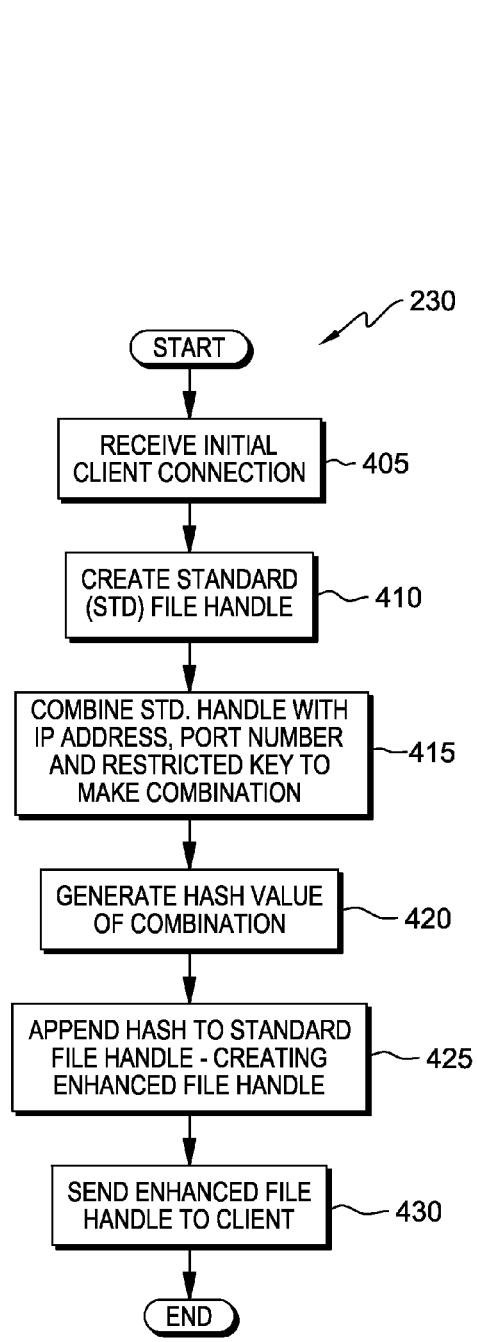
FIG. 4 is a flowchart depicting the steps of an enhanced file handle generation program in accordance with an embodiment of the present invention.

In an exemplary embodiment of the invention, file server 110 uses a verify enhanced file handle 220, illustrated in FIG. 4 block diagram, to verify the client's access privileges to perform an operation on a requested file. Verify enhanced file handle 220 receives a request from a client that includes an enhanced file handle, and uncouples the hashed identifying component from the standard file handle component. Verify enhanced file handle 220 uses client IP address 120, port number 130 and the standard file handle received with the request to create a new hashed combination. Comparing the new hashed combination with that which was received as an enhanced file handle component of the client request, verify enhanced file handle 220 determines if the two hashed values match. If the two hashed values match, then the enhanced file handle is valid and the client request is accepted by file server 110. If the two hashed values are not an exact match, then the client request is denied. If a malicious attacker tried to spoof the IP address and port number of a client, it is very unlikely that the attacker knows the restricted key of file server 110 and performing a hash function on the combination of the values makes guessing or brute force determination difficult beyond practical limits. Distributed file sharing system 100, such as, for example, NFS version 3, requires stable IP addresses for successful use of the file sharing protocol by clients. For this reason, use of client IP address 120 as a component to identify client 160, which is available to file server 110 as part of the request by client 160, is efficient.

FIG. 2 also depicts a network file sharing processes 210, which includes the additional processes used by file server 110 to perform file sharing operations requested by client 160 or other clients, and to perform required file sharing local administrative operations for file server 110. Network file sharing processes 210 can include, but are not limited to, operations to enable clients to read files, write to files, save files, create files, delete files and append files.

Figure 3:
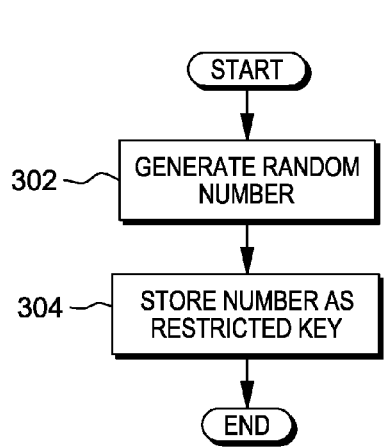
FIG. 3 is a flowchart depicting the steps of a restricted key generation program in accordance with an embodiment of the present invention.

FIG. 3 depicts a flowchart illustrating the steps of generate restricted key 250. In one embodiment, generate restricted key 250 is performed by file server 110 during an initial set-up session, such that restricted key 270 for file server 110 is available and stored securely, to be used by other processes of file server 110. For example, restricted key 270 may be used by generate enhanced file handle 230 to create an enhanced file handle. Prior to generating an enhanced file handle, file server 110 calls generate restricted key 250 which uses a random number generator function to produce a random number of specified length (step 302), such that brute force methods of determining the random number are impractical. Once the random number has been generated, generate restricted key 250 stores the random number in a storage device connected to file server 110 (step 304). In one example, generate restricted key 250 stores restricted key 270 in persistent storage device(s) 608, which is connected to file server 110 and once restricted key 270 is securely stored in a storage device, connected and accessible to file server 110, generate restricted key 250 ends. In other embodiments, the random number generator may receive input to seed the random number process by providing an unpredicted initiation point, further randomize the generation of restricted key 270. For example, during the set-up of a distributed file sharing system, such as NFS version 3, for example, file server 110 requires the establishment of restricted key 270 that is to remain known only to file server 110. Generate restricted key 250 is initiated by selection or by another process call associated with setting up a distributed file sharing system, such as NFS, for example. Generate restricted key 250 may request input or receive input from another process, that includes a seed number to initiate the random number generator. The random number generator produces restricted key 270 and generate restricted key 250 may perform additional operations to further protect restricted key 270, and then generate restricted key 250 stores restricted key 270 on a storage device connected to file server 110. Once restricted key 270 has been securely stored, generate restricted key 250 ends.

FIG. 4 illustrates a flowchart depicting the steps of generate enhanced file handle 230 which is a process of file server 110 that generates an enhanced file handle in response to an initial request from a client connection. In an exemplary embodiment, when an initial client connection is received by file server 110, generate enhanced file handle 230 starts and receives the client connection message (step 405). Generate enhanced file handle 230 obtains client IP address 120 and port number 130 from the received client connection message and retrieves restricted key 270 generated by generate restricted key 250. Generate enhanced file handle 230 creates the standard file handle, (step 410), that is associated with the client access of the file system, whose initial connection was received. Having obtained client IP address 120, transport protocol port number 130 and restricted key 270, as well as the standard file handle, generate enhanced file handle 230 combines these items by concatenation or other operations (step 415). The resulting combination includes client identification elements as well as an element known only to the file server. Generate enhanced file handle 230 performs a hashing operation on the combination (step 420), and appends or otherwise combines the hashed combination with the standard file handle (step 425) to create an enhanced file handle. Generate enhanced file handle 230 passes the enhanced file handle to the client that made the initial connection (step 430), which enables the client to use the enhanced file handle for a subsequent request to file server 110. When the enhanced file handle is delivered to the client, generate enhanced file handle 230 ends.

In an example, during system boot-up, client 160 initiates a connection (first client request) with file server 110, which passes on the connection information of client 160 and starts generate enhanced file handle 230. The initial client connection information received includes the IP address (192.255.111.1) and the transport protocol port number (1023) of client 160, for example. Generate enhanced file handle 230 uses 192.255.111.1 as an IP address and 1023 as a port number from client 160, and creates a standard file handle, which can be for the root directory of shared files which client 160 is approved to access. Generate enhanced file handle 230 retrieves restricted key 270 and using the IP address, port number and standard file handle, combines these in a configurable manner, such as concatenation in a specific order, or performing mathematical or other operations on the items and obtaining a result based on client IP address 120, port number 130, restricted key 270 and the standard file handle. Creating a simplified example of an embodiment, the 256 bit or greater restricted key 270 is simplified to the sequence: 1234567, and if a file handle were simplified as 98765432, a possible combination of the IP address, the port number, the restricted key and the standard file handle, respectively, may be: 19225511110231234567998765432.

In another embodiment, each item may be multiplied by a random prime number before combining, for example, or client IP address 120, transport protocol port number 130, restricted key 270 and the standard file handle values could all be multiplied together to produce a single result. Embodiments of the present invention can be implemented using any method of combination or operations that use client IP address 120, transport protocol port number 130, file server restricted key 270 and the standard file handle, to create a result that is combined with the standard file handle. A cryptographic hash operation is performed on the result, which for a simplified example can be represented by: 89DE AC2E 3349 B7B3 5AF2 and the hash is appended to the standard file handle forming the enhanced file handle, which in our simplified example would be: 9876 5432 89DE AC2E 3349 B7B3 5AF2. Responding to the initial connection from client 160, generate enhanced file handle 230 provides the enhanced file handle to client 160, and ends.

Figure 5:
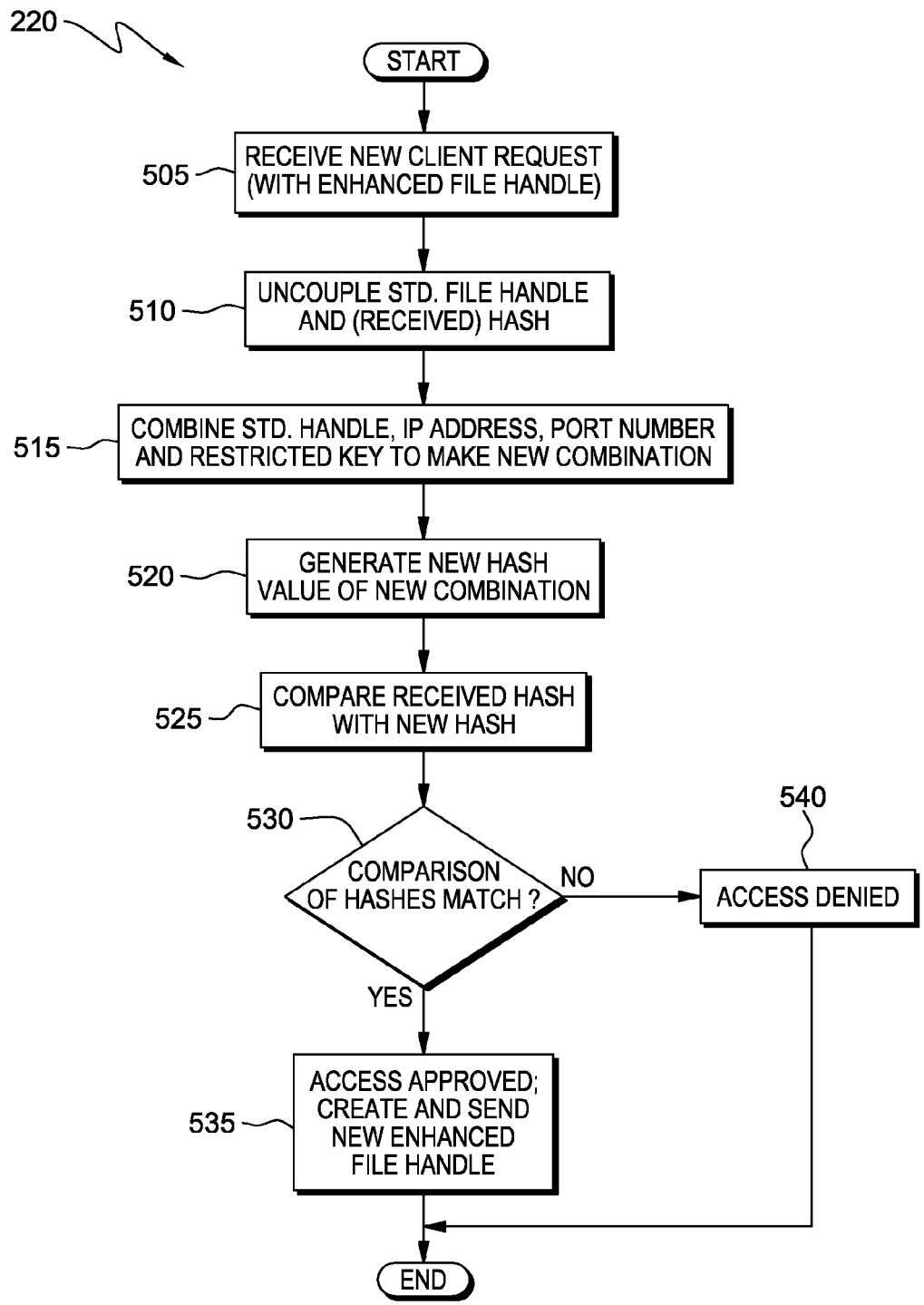
FIG. 5 is a flowchart depicting the steps of an enhanced file handle verification program in accordance with an embodiment of the present invention.

FIG. 5 is a flowchart illustrating the steps of a verify enhanced file handle 220 which is a program process that receives an enhanced file handle included with a shared file client request (second client request) and verifies that the client is authorized to access the requested file and perform the requested action. Verify enhanced file handle 220 initiates when file server 110 receives a client request that includes an enhanced file handle (step 505). File server 110 initiates verify enhanced file handle 220 and passes the information associated with the client request, including an enhanced file handle. The enhanced file handle includes the standard file handle and an appended hash (see discussion of step 420 above) which is generated from an operation using client IP address 120, port number 130, restricted key 270 and the standard file handle. Verify enhanced file handle 220 uncouples the standard file handle and hash from the enhanced file handle (step 510). The IP address and transport protocol port number are obtained as part of the client request received by verify enhanced file handle 220, which also retrieves restricted key 270. Verify enhanced file handle 220 combines client IP address 120, port number 130 and restricted key 270 with the standard file handle (step 515). Combining the IP address and the transport protocol port number from the client request, with the file server restricted key and the standard file handle uncoupled from the enhanced file handle included in the client request, results in a new combination similar to the operations performed in step 415 of generate enhanced file handle 230.

Verify enhanced file handle 220 generates a hash value of the new combination, using a cryptographic hash function (step 520). Verify enhanced file handle 220 compares the resulting new hash value to the hash value uncoupled from the received enhanced file handle of the client request (step 525). Because the generated hash value of step 520 uses attributes of the client and the enhanced file handle included in the client request, the resulting new hash value will match the hash value appended to the enhanced file handle if the request is genuinely from the client to whom the enhanced file handle was sent. Verify enhanced file handle 220 determines the results of the comparison of the hash values (decision step 530) and if the received hash value matches the generated new hash value, the identity and access authority of the client request is approved (step 535). However, if the hash values do not match exactly, the client request is denied (step 540), and verify enhanced file handle 220 ends.

Figure 6:
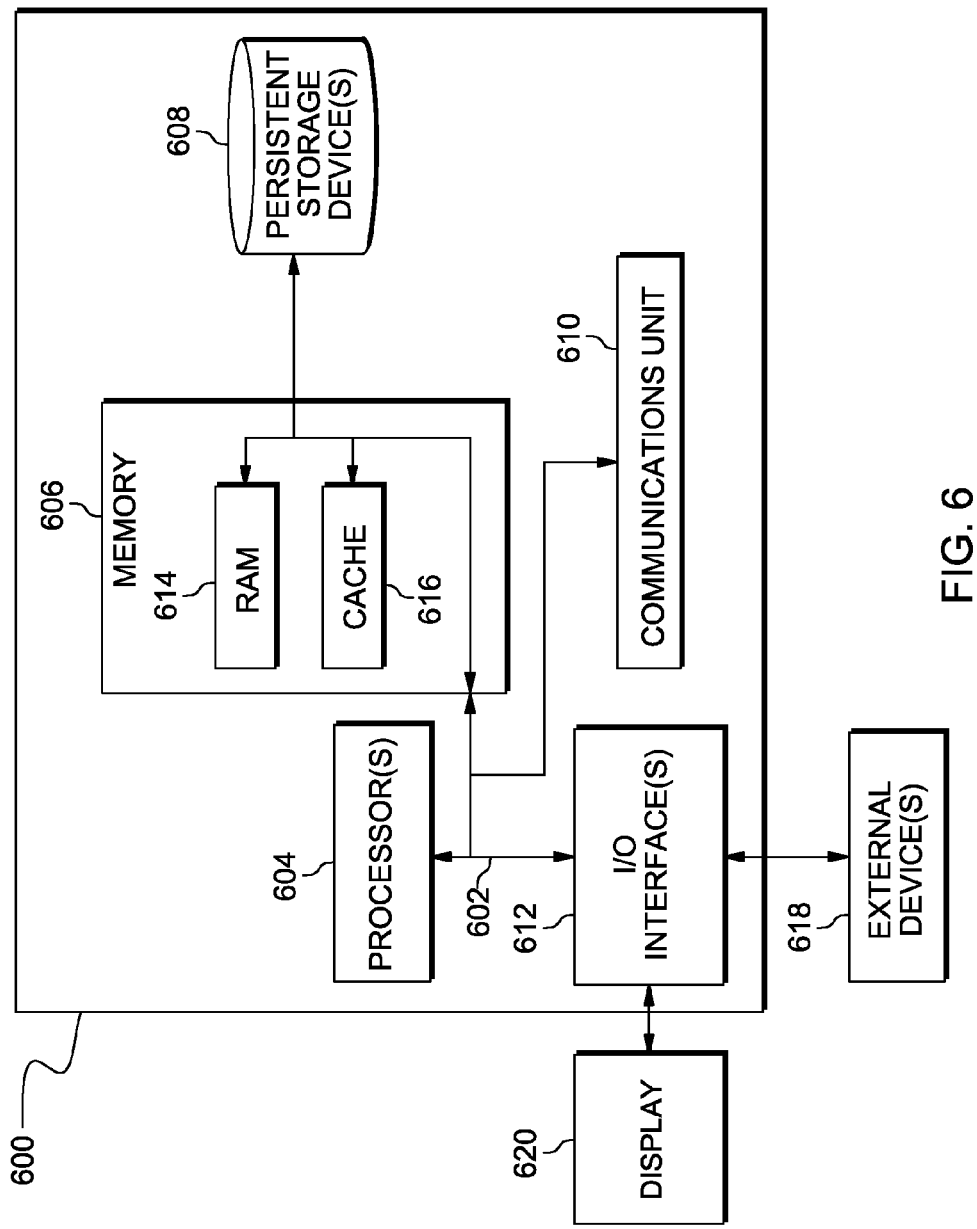
FIG. 6 is a block diagram of hardware and software within the computing devices of FIG. 1 in accordance with an embodiment of the present invention.

FIG. 6 depicts a block diagram of programmable data processing apparatus 600 components. Programmable data processing apparatus 600 may be a computing device, such as client 160, client 170 and file server 110 of distributed file sharing system 100, in accordance with an illustrative embodiment. It should be appreciated that FIG. 6 provides only an illustration of one implementation and does not imply any limitations with regard to the environment in which different embodiments may be implemented. Many modifications to the depicted environment may be made.

Programmable data processing apparatus 600 includes communications fabric 602, which provides communications between processor(s) 604, memory 606, persistent storage device(s) 608, communications unit 610, and input/output (I/O) interface(s) 612.

Memory 606 and persistent storage device(s) 608 are examples of computer-readable tangible storage devices. A storage device is any piece of hardware that is capable of storing information, such as, data, program code in functional form, and/or other suitable information on a temporary basis and/or permanent basis. Memory 606 may be, for example, one or more random access memories (RAM) 614, cache memory 616, or any other suitable volatile or non-volatile storage device.

In an exemplary embodiment, file sharing processes 260, generate restricted key 250, create file handle 240, generate enhanced file handle 230, verify enhanced file handle 220 and network file sharing processes 210 are stored in persistent storage device(s) 608 for execution by one or more of the respective processors 604 via one or more memories of memory 606. In the embodiment illustrated in FIG. 6, persistent storage device(s) 608 includes flash memory. Alternatively, or in addition to, persistent storage device(s) 608 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage device(s) 608 may also be removable. For example, a removable hard drive may be used for persistent storage device(s) 608. Other examples include an optical or magnetic disk that is inserted into a drive for transfer onto another storage device that is also a part of persistent storage device(s) 608, or other removable storage devices such as a thumb drive or smart card.

Communications unit 610, in these examples, provides for communications with other data processing systems or devices. In these examples, communications unit 610 includes one or more network interface cards. Communications unit 610 may provide communications through the use of either or both physical and wireless communications links. In another embodiment still, programmable data processing apparatus 600 may be devoid of communications unit 610. File sharing processes 260, which includes generate restricted key 250, create file handle 240, generate enhanced file handle 230, verify enhanced file handle 220 and network file sharing processes 210 may be downloaded to persistent storage device(s) 608 through communications unit 610.

I/O interface(s) 612 allows for input and output of data with other devices that may be connected to programmable data processing apparatus 600. For example, I/O interface 612 may provide a connection to external devices 618 such as a keyboard, keypad, a touch screen, and/or some other suitable input device. I/O interface(s) may also connect to a display 620. Display 620 provides a mechanism to display data to a user and may be, for example, a computer monitor.

Based on the foregoing, a method, computer system, and computer program product have been disclosed for authenticated file handles for network file systems. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation. Many modification and variations are possible. Such modifications and variations that may be apparent to a person skilled in the art of the invention are intended to be included within the scope of the invention as defined by the accompanying claims.

What is claimed is:

1. A method for enhancing a file handle within a distributed file sharing system including one or more file sharing computers connected to a network, the method comprising:

receiving a first client request, wherein the first client request includes information about a client computer;

in response to receiving the first client request, creating a standard file handle;

generating a first combination that includes information about the client computer received from the first client request, the standard file handle and a key that includes a random value, wherein the random value of the key is restricted to the one or more file sharing computers;

encrypting the first combination and appending the encrypted first combination to the standard file handle, creating an enhanced file handle;

sending the enhanced file handle to the client computer;

receiving a second client request, wherein the second client request includes information about the client computer and the enhanced file handle;

in response to receiving the second client request, the one or more file sharing computers uncoupling the file handle and the encrypted first combination from the enhanced file handle;

generating a second combination from information about the client computer received in the second client request, the standard file handle uncoupled from the enhanced file handle of the second client request and the key that includes the random value that is restricted to the one or more file sharing computers;

encrypting the second combination;

comparing the encrypted second combination to the encrypted first combination; and in response to determining the encrypted second combination matches the encrypted first combination, accepting the second client request.

2. The method of claim 1, wherein the distributed file sharing system is a Network File System (NFS).

3. The method of claim 1, wherein the distributed file sharing system does not include one or more proxy servers to perform a file sharing operation.

4. The method of claim 1, wherein the step of generating the first combination and the step of generating the second combination that includes information about the client computer received from the first client request and received from the second client request, further includes information about the client computer including an IP address of the client computer and a transport protocol port number used by the client computer to communicate with the one or more file sharing computers.

5. The method of claim 1, wherein the step of generating the first combination, and the step of generating the second combination, further comprises:

performing one or more operations on an IP address of the client computer, a transport protocol port number used by the client computer to communicate with the one or more file sharing computers, the standard file handle and the key that includes the random value that is restricted to the one or more file sharing computers.

6. The method of claim 1, wherein the step of encrypting the first combination and the step of encrypting the second combination, further comprises:

encrypting the first combination and the second combination by performing a cryptographic hash function to the first combination and to the second combination.

* * * * *